May 6, 1930. H. KNIGHT 1,757,371
JOINT FOR STEERING MECHANISMS
Filed Nov. 14, 1927
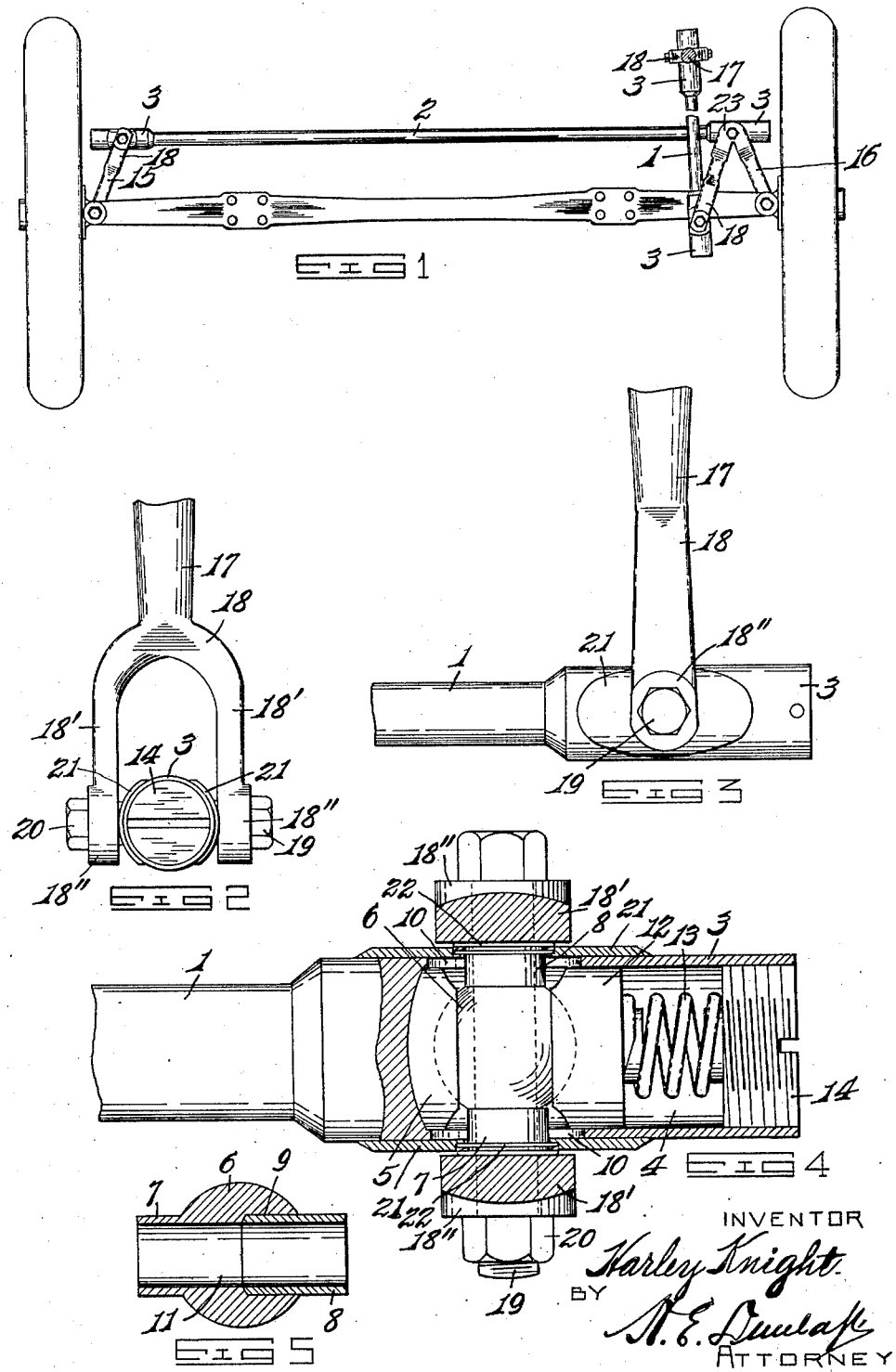
INVENTOR
Harley Knight.
BY
N. E. Dunlap
ATTORNEY Patented May 6, 1930

1,757,371

UNITED STATES PATENT OFFICE

HARLEY KNIGHT, OF SHADYSIDE, OHIO

JOINT FOR STEERING MECHANISMS

Application filed November 14, 1927. Serial No. 233,125.

This invention relates to joints for the steering mechanisms of motor vehicles, and it has for its primary object to provide an improved structure for the ball joints of an automobile steering mechanism, which joints include those between the pitman arm and the reach rod, between the reach rod and the adjacent steering arm, and between the opposite ends of the tie rod and the steering arms.

A further object is to provide a ball joint structure wherein the parts possess relatively great strength and durability and are so related that they cannot be effected by wear to the extent that chance separation or detachment may occur.

A still further object is to provide a joint of the character mentioned which is substantially proof both against leakage of the lubricant employed and against access to the working parts of dirt or dust.

With these and other objects in view, the invention resides in the features of construction, arrangement of parts and combinations of elements which will hereinafter be fully described, reference being had to the accompanying drawings, in which—

Figure 1 is a top plan view of the reach rod and tie rod of an automobile, together with the directly associated parts, the same being constructed in accordance with my invention;

Figure 2 is an enlarged end elevation either of a reach rod or a tie rod showing attached thereto the yoke end of the therewith associated member of the steering mechanism;

Figure 3 is a side elevation of the same;

Figure 4 is an enlarged sectional elevation of the invention; and

Figure 5 is a longitudinal section of the ball with its sleeve extensions.

Referring to said drawings, 1 designates the reach rod, and 2 the tie rod of an automobile steering mechanism. Each of said rods has cylindrical end portions 3, preferably of increased diameter, as shown, said end portions having therein longitudinally extending sockets 4 which extend inward a suitable distance from the ends of said portions.

Seated at the inner end of each socket 4 is a ball socket 5, preferably of brass, the outer face of which has therein a concave seat upon which is seated a ball 6. Said ball has therein a diametrical bore 11 alined with similar bores provided longitudinally in oppositely disposed tubular, or sleeve-like, extensions 7 and 8, of which one, as the extension 7, is preferably integral with said ball. The other sleeve extension 8 is removably carried by said ball, having its inner end closely fitted within a socket 9 provided therefor in said ball, as shown in Fig. 5.

The ball 6 is disposed within the socket 4 with the extensions 7 and 8 projecting outwardly through openings 10 provided therefor in diametrically opposite sides of the enlarged end 3 of the rod. Manifestly, the object had in view in making the sleeve extension 8 separate from, rather than integral with, the ball is to permit introduction of the ball to its proper position, said ball being inserted in the socket 4 through the end of the latter and then being rotated in said socket to project the integral sleeve extension 7 through one of the openings 10, which latter have an oblong or slot form. The extension 8 is introduced in place in the socket 9 of the ball by directing an end thereof inwardly through the opposite opening 10 following the positioning of said ball, as described.

An outer ball socket 12, fitted within the socket 4, has in its inner face a concave seat for the reception of the adjacent surface of the ball 6. A compression spring 13 having its inner end seated upon the outer face of the ball socket 12 is adapted to be suitably compressed by a screw plug 14 threaded within the end of the socket 4 for yieldably holding the ball in its place.

The rod end 3 is designed to be coupled to a therewith cooperating part, as to one or the other of the steering arms 15 and 16, or to the pitman arm 17, of the steering mechanism, such part having a forked end, or yoke, 18. The parallel members 18' of said yoke are disposed on opposite sides of said rod end and have eye portions 18'' embracing the opposite ends of a headed bolt 19 which is directed axially through the bore of the ball 6 and therewith alined sleeve extensions 7 and 8 and which carries a nut 20 upon its threaded end.

Disposed in more or less closely embracing relation to each of the sleeve extensions 7 and 8 between the eye portions 18″ of the yoke 18 and the adjacent outer surface of the rod end 3, and occupying closely seated relation to said surface, is a plate 21 which covers the adjacent opening 10, closing the latter both against leakage of the lubricant employed and against admission of dust or dirt. Said plates 21 are held yieldingly in seated relation to the surfaces of the rod end 3 by means of light coil springs 22 which are interposed between said plates and the adjacent eye portions of the yoke members 18′, and are adapted for longitudinal sliding movements on said surfaces induced by movements of the ball in its socket 4.

The steering arm 16, being designed to have coupled thereto both the reach rod 1 and the tie rod 2, may have either an arcuately curved or the angular formation shown in Fig. 1. The end of said steering arm embodies a yoke 18, having the form hereinbefore described, for coupling to the forward end of the reach rod 1. Additionally, a yoke-like formation is provided in said arm in the rearmost curved or angular portion thereof, as shown at 23 in Fig. 1, thereby to afford a coupling element adapted to cooperate with the adjacent end of the tie rod 2.

What is claimed is:—

In combination with a member having an integral tubular part and having an integral wall at the inner end of said tubular part, a ball socket abutting said wall, a ball in the socket, a second ball socket opposite to said first socket and disposed in the outer end of the tubular part, a threaded plug at the terminal of said outer end of the tubular part, a coil spring between the second ball socket and the plug, said ball having a diametrical bore and opposed tubular extensions alined with the bore, one of which tubular extensions is integral with the ball and the other of which is removably connected to the ball, said tubular part being formed with openings to receive said ball extensions therethrough, a forked element embracing the tubular part, and a bolt connected to the forks of said element and extending through the bore and the extensions of the ball.

In testimony whereof I affix my signature.

HARLEY KNIGHT.